United States Patent
Hollis et al.

(10) Patent No.: US 10,127,508 B1
(45) Date of Patent: Nov. 13, 2018

(54) DYNAMICALLY CHANGING SALES COMMISSIONS

(71) Applicant: Square, Inc., San Francisco, CA (US)

(72) Inventors: Caroline Hollis, San Francisco, CA (US); Amir Nathoo, San Francisco, CA (US); James Colin Brady, San Francisco, CA (US); Connor H. Dunn, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 939 days.

(21) Appl. No.: 14/595,932

(22) Filed: Jan. 13, 2015

(51) Int. Cl.
*G06Q 10/06* (2012.01)
*G06Q 10/08* (2012.01)

(52) U.S. Cl.
CPC ..... *G06Q 10/06313* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 2009/0119207 A1* | 5/2009 | Grecia | G06Q 20/10 | 705/40 |
| 2012/0010940 A1* | 1/2012 | Masi | G06Q 20/20 | 705/14.39 |
| 2013/0013371 A1* | 1/2013 | Katsakhyan | G06Q 30/02 | 705/7.29 |
| 2015/0046228 A1* | 2/2015 | Lamb | G06Q 10/06393 | 705/7.39 |
| 2015/0170163 A1* | 6/2015 | Wagner | G06Q 30/0201 | 705/7.29 |
| 2016/0027068 A1* | 1/2016 | Brantley | G06Q 30/0276 | 705/14.72 |

* cited by examiner

*Primary Examiner* — Sujay Koneru
*Assistant Examiner* — Mohamed N El-Bathy
(74) *Attorney, Agent, or Firm* — Lee & Hayes, PLLC

(57) ABSTRACT

A salesperson may be paid commissions for products sold from the inventory of a merchant. In some examples, the commissions for different products may be determined and changed dynamically, throughout the course of a business day, in response to changing sales rates and inventory conditions. Specifically, commissions may be changed to increase the sales rates of certain products over others. As an example, it may be desired to increase the sales rates of products having relatively high inventory counts and/or that are nearing the expiration of their shelf lives. The changing commission amounts are published or advertised to the salespersons throughout the day so that the salespersons can see which products will produce the highest commissions. The commissions may be paid electronically, immediately or soon after the transactions in which the commissions were earned.

20 Claims, 4 Drawing Sheets

DYNAMICALLY CHANGING SALES COMMISSIONS

BACKGROUND

A merchant may employ or use the services of salespersons to sell products from an inventory of the merchant. In some cases, the merchant may pay the salespersons at least partially on the basis of sales commissions. For example, a salesperson may receive a 5% commission for everything sold by the salesperson.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
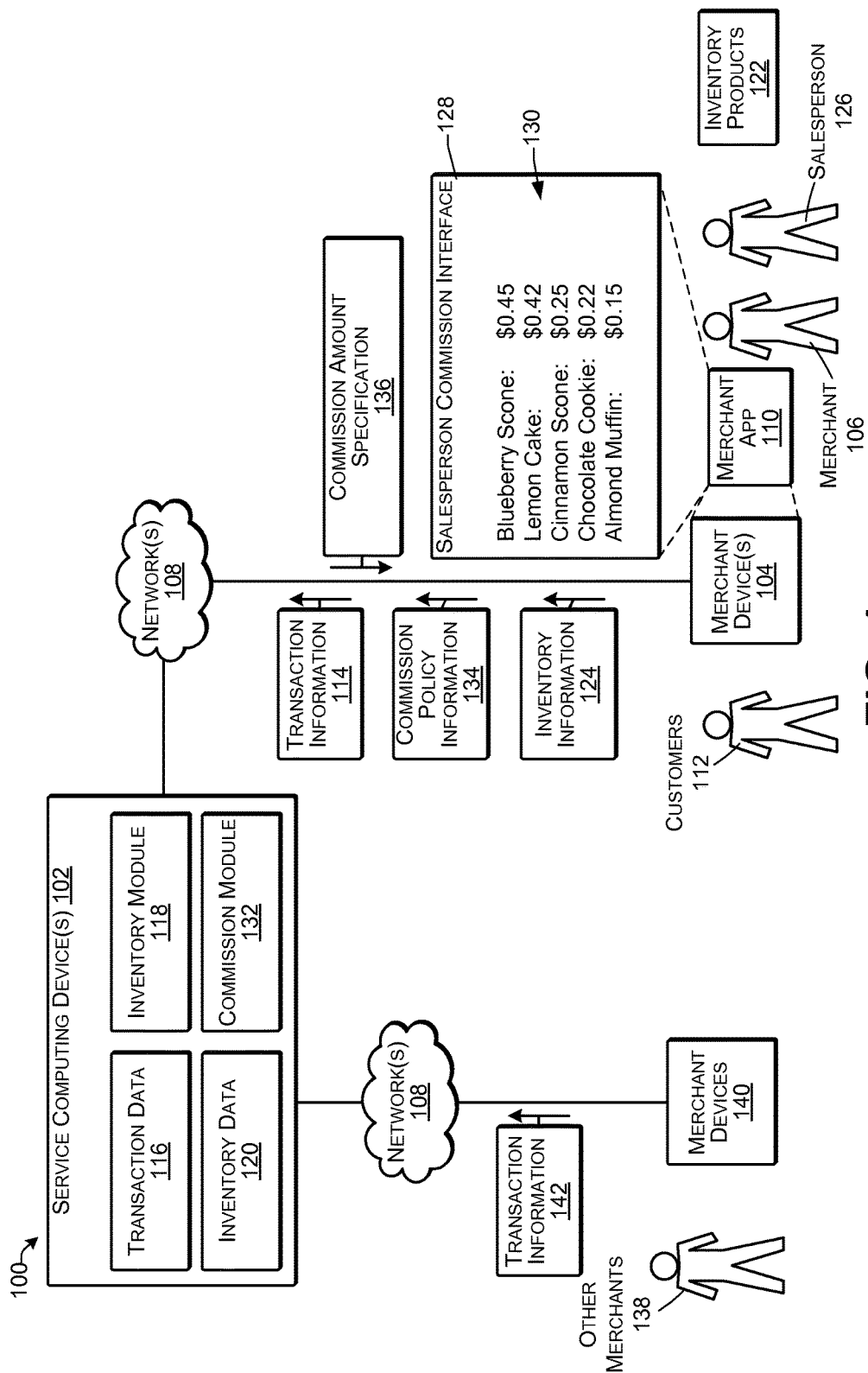
FIG. 1 is a block diagram illustrating an example environment in which a service provider determines and provides dynamically changing commissions to salespersons based at least in part on real-time inventory information.

Implementations described herein include techniques and arrangements for establishing and dynamically changing the amounts of sales commissions that are available to salespersons who sell products for a merchant. In a business that sells perishable goods, for example, the age of a product may be evaluated against the shelf life of the product to determine a sale priority of the product. The commission paid to a salesperson for selling the product may then be increased as a function of the sale priority of the product. Salespersons are made aware of increasing commissions so that the salespersons are increasingly incentivized to sell prioritized products. Inventory information and sales rates may be monitored in real time so that commissions can be changed throughout a business day in light of current sales rates and inventory counts.

The sale priority of a product may be determined based on inventory information that includes any number of factors, such as current sales rate of the product, profit margin for the product, current inventory level of the product, shelf life of the product, inventory age of the product, popularity of the product, current and projected valuation of the product, current and projected demand for the product, carrying costs of the product, projected times to obsolescence of the product, space usage for storing the product, and so forth. The factors may be compared for different products within the merchant's inventory to establish commissions for the different products relative to each other, in order to increase sales rates of those product having the highest sale priorities.

In certain embodiments, inventory information may be evaluated and updated in real time in response to point-of-sale (POS) transaction information that is received throughout the business day. For example, transaction information may be received from a POS device that is used by the merchant to conduct sales transactions with customers. The transaction information may indicate which products are sold and the number of product items sold. The transaction information may be analyzed to determine a sales rate of a product item (e.g., the number of product items that are sold over a time period).

Product priorities and commissions may be evaluated and updated in real time in response to changing inventory and product information throughout the course of a business day in order to achieve desired sales rates for different products in light of changing conditions. As an example, the current sales rate for a product may be used to predict that items of the product will exceed their shelf life unless the sales rate is increased. In this case, the commission for the product may be increased in an attempt to increase the sales rate of the product.

Updated commission amounts for different products may be published to the salespersons throughout the day. For example, a salesperson may access a list of products and their corresponding available commissions by accessing an application on the merchant POS device. In some cases, the list may be ordered to specifically notify the salesperson of newly updated commissions or of products that currently have the highest or most attractive commissions.

In some cases, commissions may be paid to salespersons immediately or very soon after the sales that generated the commissions. For example, an electronic payment of a commission to a bank account of a salesperson may be initiated immediately after completion of the sale. In some cases, commissions may be paid at the end of every business day or prior to the next work shift of the salesperson.

For discussion purposes, example implementations are described in the environment of a service computing device that provides various services, which may include transaction services, inventory services, payment services, and commission services. However, implementations are not limited to the particular examples provided, and may be extended to other environments, other system architectures, other types of merchants and business situations, and so forth.

FIG. 1 illustrates an example environment 100 in which various services may be provided for merchants. The services may include point-of-sale (POS) transaction services, commission services, inventory services, payment services, and other services. The environment 100 may enable a service provider to provide variable and dynamically changing commissions to salespersons of a merchant based on inventory information, transaction information, and other information. FIG. 1 shows components relating to transaction processing, inventory monitoring, and commission determination. Other components, relating to payments of commissions, will be described with reference to FIG. 2.

In the illustrated example, one or more service computing devices 102 (hereinafter "the service computing device 102") of a service provider communicate with one or more merchant devices 104 of a merchant 106 over one or more networks 108. The merchant device 104 may include an instance of a merchant application 110 that executes on the merchant device 104. The merchant application 110 may in some implementations provide POS functionality to the merchant device 104 to enable the merchant 106 to accept payments from customers 112.

The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

A merchant may comprise any business engaged in the offering of goods or services (referred to herein as products) for acquisition by customers in exchange for compensation received from the customers. Actions attributed to a merchant may include actions performed by employees or other agents of the merchant and, thus, no distinction is made herein between merchants and their employees unless specifically discussed.

A merchant and a customer may interact with each other to conduct a sales transaction in which the customer acquires one or more product items from a merchant, and in return, the customer provides payment to the merchant. Payment may be made using various techniques, including cash payment, electronic payment, payment by debit or credit card, drawing upon a credit line, etc. A customer may comprise any entity that acquires products from a merchant, such as by purchasing, renting, leasing, borrowing, licensing or the like.

When the merchant 106 engages in a sale transaction with the customer 112, the merchant device 104 sends transaction information 114 to the service computing device 102. The transaction information 114 is typically sent as the transaction is being conducted. The service computing device 102 receives the transaction information 114 and stores the transaction information 114 as transaction data 116. The transaction data 116 stored by the service computing device 102 may include transaction information 114 for multiple sales transactions.

The transaction information 114 may include information regarding the time, place and/or the amount of a corresponding sale transaction, the identity of the merchant, an identification of the product or products sold, the number of items of each product sold, a type of payment (e.g., cash, check, payment card, electronic payment, etc.), the amount of a sales commission to be paid in conjunction with the transaction, etc. If a payment card is used, the transaction information 114 may include data stored in the payment card (e.g., Track 1 data (cardholder name, card number and other card information)). The service computing device 102 may be configured to process or initiate payments from the customers 112 to the merchants 106 based on the transaction information 114.

The service computing device 102 may include an inventory module 118 that performs various operations related to inventory of product items. For example, the inventory module 118 may monitor inventory levels of the merchant 106. Specifically, the inventory module 118 may store inventory data 120 for multiple inventory products 122 that are stocked by the merchant 106. The inventory data 120 may indicate inventory counts of the inventory products 122, where the inventory count of each product indicates how many items of the product are currently in stock. The inventory data 120 may also indicate the shelf life of each product and an age of each product or product item.

The inventory data 120 may also indicate other factors relating to respective products, including such things as the sales price of each product, current sales rates for each product, the profit margin for each product, the currently offered commission amount for each product, the demand for each product, the current value of each product, the carrying costs of each product, the time to obsolescence of each product, the inventory spaced used to store each product, etc.

The inventory data 120 may be compiled in part from inventory information 124 that is provided by the merchant 106. For example, the merchant 106 may use the merchant application 110 to provide information regarding starting inventory levels, such as by entering information regarding inventory items that have been acquired and added to inventory. The merchant 106 may also provide other information relating to inventory products such as cost, value, sales price, temporary discounts, acquisition date, shelf life, space/shelf usage, cost of storage, supplier, etc. The inventory information 124 may include all of this information.

The inventory data 120 may be updated as sales transactions are conducted based on the transaction information 114. Specifically, the transaction information 114 indicates product items that have been sold and the quantities of the product items sold. The inventory module 118 deducts these quantities from existing inventory counts to keep the inventory data 120 current in real time. Accordingly, the inventory data 120 indicates real-time inventory counts of the inventory products 122.

In the described environment, the merchant 106 may employ or work with one or more salespersons 126 who sell products from the inventory of the merchant. A salesperson 126 may be paid at least partially on the basis of commissions. For example, a salesperson may be paid a specified commission for each product item sold. In the described implementations, the amounts and/or percentages of the commissions may differ between products and may be changed dynamically during business operation, such as during or throughout a business day or other time period. Thus, a product sold at one point in the business day may earn a first commission while a product sold at a later point in the business day may earn a second, different commission.

The salesperson 126 may use the merchant device 104 to initiate and conduct a sales transaction for one or more product items. The merchant device 104 may generate the transaction information 114 described above and may send the transaction information 114 to the service computing device 102 to initiate or record a transfer of money between the customer 112 and the merchant 106. The transaction information 114 may in some cases indicate the amount of the commission that is payable to the salesperson 128 as a result of the sales transaction. The transaction information also indicates the products sold as part of the transaction and the number of items of each product sold.

Throughout the day, the salesperson 126 may access the merchant application 110 to view a user interface 128, also referred to herein as a salesperson commission interface, that shows a listing 130 of products and corresponding commission amounts. The listed commission amounts may influence the salesperson 126 to encourage sales of some products over others. Specifically, the salesperson 126 may be influenced to sell those products having the highest relative commissions.

The service computing device 102 has a commission module 132 that is configured to set and dynamically update the commission amounts for individual products of the inventory products 122 in order to influence sales rates of different products. The commission module 132 sets the commission amounts based on a variety of information, which may include the inventory data 120 associated with the merchant 106 and the transaction data 116 associated with the merchant 106. In addition, the merchant 106 may provide commission policy information 134 for use by the commission module 132 in determining and updating product commission amounts. The commission policy information 134 may indicate such things as:

- the overall percentage of sales the merchant wants to dedicate to commissions;
- the highest possible commission amount, such as a fixed amount or a percentage of a product sale price;
- a minimum merchant profit margin, where the commission amount is limited to ensure that the minimum profit margin is achieved; and
- minimum commission amount.

Throughout a business day or other time period, the commission module 132 monitors inventory counts and other information indicated by the inventory data 120 and determines relative sale priorities for different inventory products 122. For example, products that are in danger of exceeding their shelf lives may be given relatively higher sale priorities. Other factors that may elevate the sale priority of a product may include a relatively high margin for the product, a relatively high inventory count of the product, a relatively short product obsolescence time of the product, a relatively low sales rate of the product, and so forth.

In some cases, priorities may be evaluated based on combinations of factors. For example, the sale priority of a product may be influenced by or based upon the current sales rate of the product, the inventory count of the product, the desired inventory level of the product, and the wholesale availability or ordering lead time of the product. More specifically, the sale priority of a product may be changed to influence the sales rate of the product so that the desired inventory count of the product can be maintained in light of wholesale availability of the product.

As another example the sale priority of a product may be changed to influence the sales rate of the product so that the sales rate approximately equals the rate at which the product can be obtained by the merchant, especially in the case of products having high margins.

As yet another example, the sale priority of a product may be increased in order to increase the sales rate of the product so that existing inventory of the product can be sold before the product become obsolete or before the existing inventory exceeds its shelf life.

Upon determining and/or updating commission amounts for one or more of the products 122, the commission module 132 provides a commission amount specification 136 that specifies the commission amount that is currently being offered for each of the inventory products 122. The merchant device 104 receives the commission amount specification 136 and presents it as the listing 130 of the salesperson commission interface 128.

The listing 130 may be filtered, ordered or otherwise configured to emphasize or highlight the products that are associated with the highest commissions, so that the salesperson 126 may be kept up to date throughout the business day regarding the highest paying products.

In addition to providing services for the merchant 106, the service computing device 102 may also provide inventory and commission services for multiple merchants 138, other than the merchant 106. Each of the other merchants 138 may use respective POS merchant devices 140, which may be similar to the merchant device 104. The other merchants 138 may provide transaction information 142 through the network 108 to the service computing device 102. The service computing device 102 may store the transaction information 142 as part of the transaction data 116. The service computing device 102 may also provide inventory and commission management services for the other merchants 138, just as such services are provided to the merchant 106.

Figure 2:
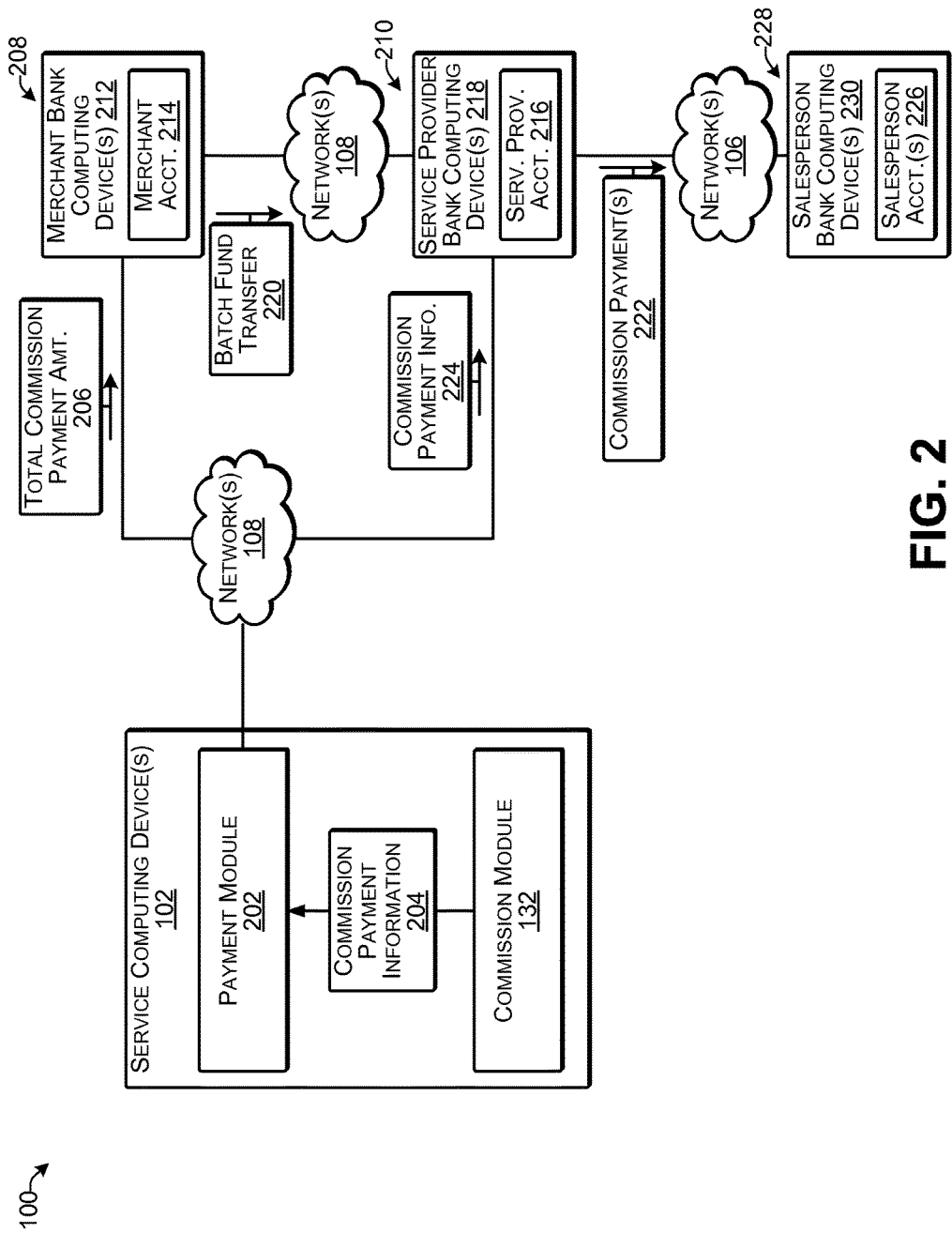
FIG. 2 is a block diagram that illustrates further details regarding the example environment of FIG. 1.

FIG. 2 illustrates further components of the example environment 100 relating to the payment of commissions to salespersons 126 of the merchant 106 by a service provider. The environment 100 may enable the service provider to make wage, salary, gratuity, and/or commission payments to salespersons and/or employees on behalf of an merchant. For purposes of this disclosure, FIG. 2 concentrates on the payment of commissions, although the same techniques may be used to pay salaries, wages, gratuities, bonuses, or compensation awards other than commissions. Furthermore, in some cases commissions and/or bonuses may be paid as part of or in conjunction with salaries, wages, and/or gratuities, using the same techniques as shown in FIG. 2.

The service computing device 102 may have a payment module 202 in addition to the other components of the service computing device 102 shown in FIG. 1. The payment module 202 is responsive to commission payment information 204 that is generated by and received from the commission module 132 to initiate payments of commissions to the salesperson 126.

The commission payment information 204 indicates the amounts of commissions to be paid to individual salespersons 126, wherein the commission amounts have been calculated by the commission module 132 in accordance with published commissions shown in the listing 130 described above. The commission payment information 204 may include other information regarding each salesperson 126 such as the name of the salesperson, tax information associated with the salesperson such as a taxpayer identification number (e.g., Social Security Number (SSN)), tax withholding information for federal and state taxes, residence information, bank account information, and so forth.

In certain cases, the commission payment information 204 may correspond to a specific business day, work day, or work shift, and may include commissions earned by multiple salespersons 126 as a result of multiple sales transactions. In other cases, the commission payment information 204 may correspond to a single salesperson 126, and/or may correspond to a commission that is being paid for a single sales transaction.

In response to receiving the commission payment information 204, the payment module 202 calculates a total commission payment amount 206 and sends a request for a transfer of the total commission payment amount 206 from a merchant bank 208 to a service provider bank 210. More specifically, the payment module 202 sends the total commission payment amount 206 to one or more merchant bank computing devices 212 corresponding to the merchant bank 208 to request transfer of funds from an account 214 of the merchant 106 to an account 216 of the service provider.

In some examples, the total commission payment amount 206 may be the total amount of the commissions that the merchant will pay to multiple salespersons 126 for a time period such as a business day or work shift. In other examples, the total commission payment amount 206 may include commissions for multiple previous business days or work shifts. For instance, the payment module 202 may pay salespersons with a different frequency than the requests for the transfer of funds are submitted to the merchant bank 208. As one example, the salespersons 126 may be paid every business day or work day, but a request for transfer of a cumulative total amount of commission payments might be sent only every week, every two weeks, or the like.

Additionally, in some examples, the total commission payment amount 206 may include an amount of tax withholdings that will be withheld from the commission payments to be made to the salespersons 126, and which will be used for a separate payment of taxes to one or more government entities on behalf of the salespersons 126. In other examples, the payment module 202 may send a separate request for a separate transfer of funds for the taxes to be paid on behalf of the salespersons 126. For instance, the frequency with which the taxes are paid to the government may be different from the frequency with which the salespersons 126 are paid, and may also be different from the frequency with which funds are requested to be transferred to reimburse the service provider for the commission payments made to the salespersons 126.

In response to receiving the request for transfer of the total commission payment amount 206, the merchant bank computing device 212 may transfer the total amount of the commission payments to the service provider bank 210, such as to one or more service provider bank computing devices 218. For example, the merchant bank 208 may transfer funds to the service provider bank account 216 using any suitable money transferring technique, and typically may use a batch-processed transfer of funds. As one example, in the United States, bank-to-bank transfers of funds may be made using a batch fund transfer 220 referred to as an ACH (automated clearing house) payment. For example, ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

In some examples, the service provider may make commission payments 222 to the salespersons 126 prior to completion of the batch fund transfer 220 from the merchant bank 208 to the service provider bank 210. For example, the payment module 202 may send commission payment information 224 to the service provider bank computing device 218 to instruct or otherwise request the service provider bank 210 to send the commission payments 222 using a payment technique specified by at least one of the employer or the respective salespersons. The commission payment information 224 may identify each salesperson 126 that is to receive a commission payment and may specify the amount of money to be paid to each salesperson 126. The commission payment information 224 may further specify how each salesperson 126 is to be paid, such as by providing the salesperson's full name, the salesperson's bank account information, the salesperson's mailing address and/or various other information about the salesperson and or the commission payment to be made to the salesperson. As one example, the commission payments 222 may be made by initiating an electronic funds transfer of the commission amount to a bank account 226 of the salesperson that is maintained by a salesperson bank 228 for the salesperson 126. This may result in a near real-time transfer of money to the salesperson account 226. As another example, a commission payment 222 may be made by a check that is mailed to a mailing address of the salesperson 126, or that is delivered to the workplace of the salesperson 126 for distribution by the merchant 106. As still another example, the commission payment 222 may be made by direct deposit using a batch fund transfer technique, such as an ACH payment.

The payment module 202 may send an electronic communication that causes the commission payments 222 to be sent to respective salesperson accounts 226 in near real-time, e.g., within a matter of seconds or minutes. For instance, notification of the commission payment 222 may be received by one or more salesperson bank computing devices 230. In some examples, the commission payments 222 may be sent via near real-time payment techniques that utilize debit card information associated with the respective salesperson accounts 226. For example, debit card payments may be used to transfer the commission payment 222 for receipt in near real-time, e.g., generally within a matter of seconds. Contrasted with ACH or other batch-processed money transfer techniques, which may take several days, the commission payment 222 made using debit card information of the salespersons (or other account information enabling near real-time transfer of funds) enables the commission payment to be received and accessed by the salesperson on the same day, same hour and/or same minute as when the commission payment 222 is initiated by the payment module 202 and/or the service provider bank 210.

Using these techniques, salespersons are able to receive commission payments on the same day as the day in which the commissions were earned or very soon after a work shift. In some implementations, the salesperson may receive a commission payment nearly immediately after concluding a transaction.

Figure 3:
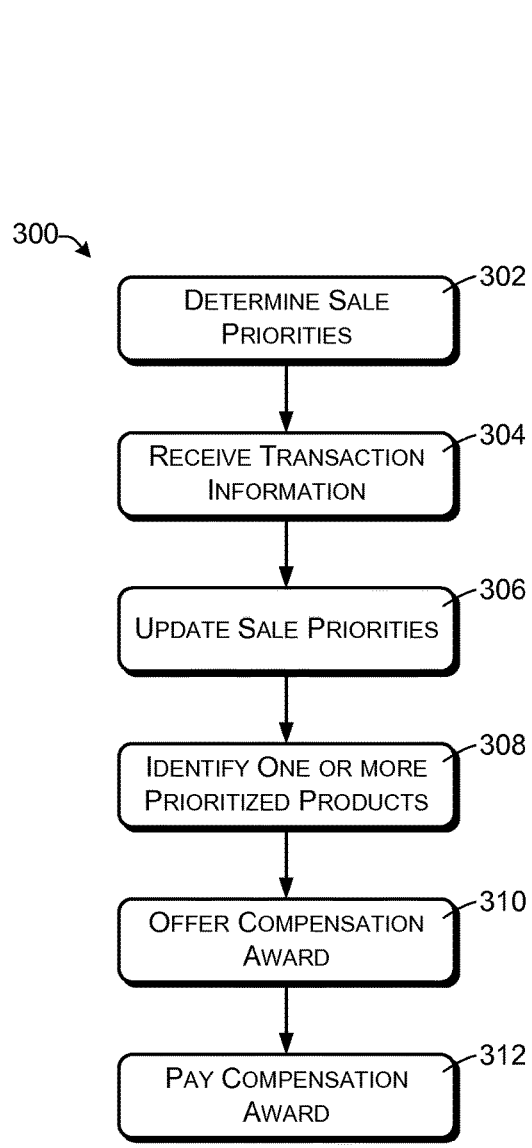
FIG. 3 is a flow diagram illustrating an example method for prioritization of products and payments of compensation awards.
Figure 4:
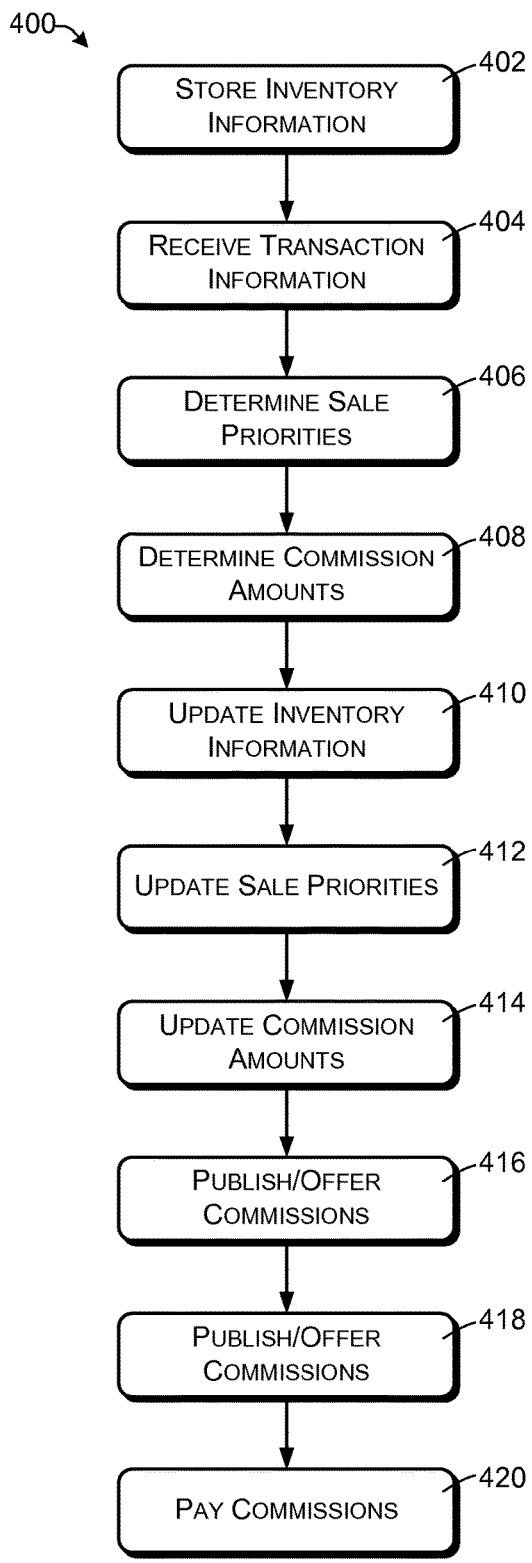
FIG. 4 is a flow diagram illustrating an example method for prioritization of products and payments of commissions for sale of the products.

FIGS. 3 and 4 are flow diagrams illustrating example processes according to some implementations. The processes of FIGS. 3 and 4 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3 and 4 may be combined with some or all of the operations illustrated in others of FIGS. 3 and 4. For discussion purposes, the processes are described with reference to the environments, architectures and devices described in the examples herein, although the processes may be implemented in a wide variety of other environments, architectures and devices.

FIG. 3 shows an example method 300 of providing commissions or other compensation awards to a salesperson for sales of products from a product inventory of a merchant.

An action 302 comprises determining sale priorities of multiple products that are stocked by a merchant. The sale priority of a product may be determined based inventory information that may include any number of factors, such as one or more of the following:

the shelf life of the product;
the age of the product;
the current sales rate of the product;
the profit margin for the product;
the demand for the product;
the value of the product;
the projected appreciation or depreciation in the value of the product;
the carrying costs of the product;
the estimated time to obsolescence of the product;
the inventory space used to store the product;
the wholesale availability of the product; or the lead-time to acquire the product.

As one example, determining the sale priority of a particular product may comprise increasing the sale priority of the product upon determining that the shelf life of the product will eventually be exceeded based on the inventory count of the product and the current sales rate of the product. As another example, determining the sale priority of a particular product may comprise decreasing the sale priority when inventory counts are low. As yet another example, the sale priority of a product may be reduced when demand for the product is already high, as evidenced by a high sales rate. As yet another example, the sale priority of a product may be increased to increase the sales rates of high margin products.

Any of the listed factors may be used in combination with other factors to determine a sale priority. For example, although certain factors may indicate a need for a higher sales priority, in some cases sales priorities may be increased only for those products having relatively high profit margins.

An action 304 comprises receiving transaction information for a plurality of sale transactions that occur during a business day. Among other things, the transaction information may indicate how many items of each product are sold during and throughout the business day. The transaction information may be received in real time, as transactions are conducted and completed. Accordingly, the transaction information may allow real-time determination of current sales rates for different inventory products as well as real-time inventory counts.

An action 306 comprises repeatedly updating the sale priorities throughout the business day based at least in part on inventory information and/or received transaction information. The sale priorities may be updated in real time, as the transaction information is received, based on inventory count, product ages, current sales rates, and any of the other factors listed above in conjunction with the action 302.

An action 308 comprises designating one of the products as being prioritized, based at least in part on the updated sale priorities. As an example, the action 308 may comprise selecting the product having the highest sale priority and designating that product as the prioritized product. In some cases, more than one product may be selected for prioritization.

An action 310 comprises offering a compensation award to one or more salespersons for one or more sales of the prioritized product. The compensation award may comprise one or more of:
  a bonus payment for selling at least a specified number of items of the prioritized product;
  a commission for each item of the prioritized product sold by the salesperson;
  a bonus payment for selling at least a specified number of items of the prioritized product within a given time period; or
  a bonus payment for sales of a specified dollar amount for a prioritized product.

An action 312 comprises paying a compensation award to a salesperson who sold a prioritized product. In the case of a per-item or per-transaction commission, the commission may be paid immediately or very soon after the conclusion of the transaction in which the prioritized product was sold. For example, the commission may be paid by initiating an electronic funds transfer of a commission amount to a bank account of the salesperson. In some cases, the commission may be credited to a debit account of the salesperson using debit card information associated with the salesperson. More generally, the commission may be paid to the salesperson using any of the techniques descried above with reference to FIG. 2.

In the case of a bonus payment, a bonus amount may be paid to the salesperson at the conclusion of the business day, prior to the next business day or prior to the next work shift of the salesperson who conducted the transaction. The bonus amount may be paid to the salesperson by initiating an electronic funds transfer of the bonus amount to a bank account of the salesperson. In some cases, the commission may be credited to a debit account of the salesperson using debit card information associated with the salesperson. More generally, the commission may be paid to the salesperson using any of the techniques descried above with reference to FIG. 2.

Certain actions of the method 300 may be performed and repeated throughout a single business day. In particular, the prioritization of products may change throughout the day based on newly received transaction information and repeatedly updated sale priorities. That is, one product may be prioritized early in the day and another product may become prioritized later in the day in response to evaluated sales rates, inventory counts, etc.

FIG. 4 shows another example method 400 of providing commissions to a salesperson for sales of products from a product inventory of a merchant.

An action 402 comprises storing inventory information for multiple products that are stocked by a merchant. In certain examples, the inventory information may include inventory counts of the products, shelf lives of the products, and ages or the products. More generally, the inventory information for a particular product may comprise any one or more of the following:
  the shelf life of the product;
  the age of the product;
  the current sales rate of the product;
  the profit margin for the product;
  the demand for the product;
  the value of the product;
  the projected appreciation or depreciation in the value of the product;
  the carrying costs of the product;
  the estimated time to obsolescence of the product;
  the inventory space used to store the product;
  the wholesale availability of the product; or the lead-time to acquire the product.

An action 404 comprises receiving transaction information for a plurality of sale transactions that occur during a business day. The transaction information indicates, among other things, how many items of each product are sold during and throughout the business day. The transaction information may indicate details for a plurality of point-of-sale (POS) transactions that occur during a business day, and may be received from a POS device associated with a merchant. The transaction information may indicate, for an individual POS transaction:
- an itemized listing of the products sold;
- the price paid for each product;
- descriptors of the product items (size, flavor, color, etc.);
- a commission amount for each product item;
- geolocation data indicating a geographic POS location of a particular transaction;
- online/offline card data; and/or
- data describing the merchant (e.g., a merchant identifier, a merchant category code (MCC), etc.).

An action 406 comprises determining sale priorities of the multiple inventory products. The sale priority of an individual product may be based at least in part on the inventory count of the product, the sales rate of the product, the shelf life of the product, the age of the product, and so on as described above. More generally, the sale priority may be based on any of the inventory information listed above with reference to the action 402.

An action 408 comprises determining commission amounts for the products stocked by the merchant. The commission amounts may be determined based on and/or may be a function of the sale priorities of the products or may be determined directly from the inventory information. Generally, products having higher sale priorities are given higher commissions. A commission may be higher in absolute terms (e.g., $0.50 rather than $0.20) or higher in terms of a percentage of sale price (e.g., 10% of the sale price rather than 5% of the sale price).

An action 410 comprises repeatedly updating inventory information throughout a business day based on received transaction information. As an example, the action 410 may comprise updating the inventory counts of products based on reported numbers of items sold, so that the inventory information indicates, throughout the day, how many items of each product are currently in stock.

In some cases, the inventory information may include sales rates for individual products. Updating the inventory information may include determining the sales rates based at least in part on the transaction information.

An action 412 comprises repeatedly updating the sale priorities of the inventory products throughout the business day based on the updated inventory information. For example, sale priorities may be updated based on inventory counts, sales rates, and any other of the factors listed above with reference to the action 402.

An action 414 comprises repeatedly updating the commission amounts for the different inventory products throughout the business day based at least in part on the updated sale priorities. Depending on how the sale priorities are determined, this may result in commissions being raised for products that are nearing the ends of their shelf lives, for products having relatively higher margins, for products that are in danger of becoming obsolete, etc. Commissions may be lowered for products having low inventory, products with low profit margins, products that are hard to obtain, and so on.

An action 416 comprises offering the updated sales commissions to salespersons of the merchant throughout the business day to influence the sales rates of the products throughout the business day and to incentivize the salespersons to sell particular products. The action 416 may comprise transmitting the updated amounts of the sales commissions to the POS device of the merchant and/or publishing currently updated sales commission amounts on the POS device or some other user interface that is available to the salespersons. Generally, the updated sales commissions may be presented to the salesperson the POS device of the merchant, on a webpage, on a mobile device, or using any other means of presentation or disclosure. The presented information changes during the business day to reflect the changing commission amounts.

An action 418 comprises paying the updated commission amounts for sales made during the business day. Specifically, for each product sold, the a commission is paid in the amount that was published in the action 416 at the time the product was sold. Payments may be may be initiated electronically using any of the payment mechanisms described above with reference to FIG. 2. In order to effectively incentivize salespersons, commission payments resulting from sales transactions may be paid immediately or very soon after the transactions, such as within a few minutes or within an hour of the transaction time, or within the work shift during which the commissions were earned. In some cases, a separate payment may be initiated for every sales transaction in which a commission was earned.

Alternatively, commissions earned during a business day may be paid at the end of the business day during which the commissions were earned, such as before the next business day or before the next work shift of the salesperson.

Although certain actions and activities are described above as taking place during a business day, the actions and activities may likewise take place during other time periods such as work shifts or time periods of different lengths.

Figure 5:
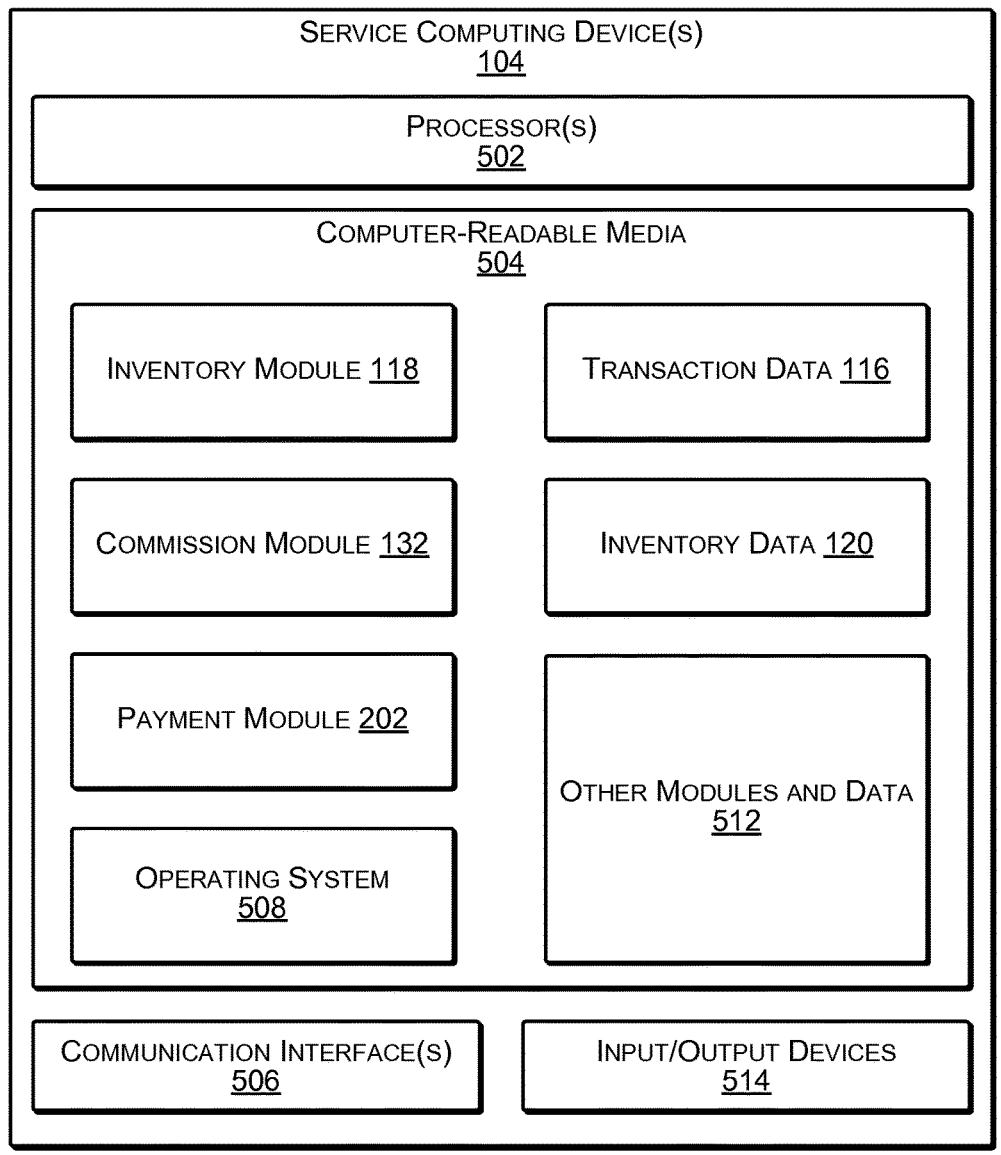
FIG. 5 illustrates select components of one or more example service computing devices according to some implementations.

FIG. 5 illustrates select components of the service computing device 102 that may be used to implement some functionality of the services described herein. The service computing device 102 may be operated by a service provider that provides the described services, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Although the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 502, one or more computer-readable media 504, and one or more communication interfaces 506. Each processor 502 may be a single processing unit or a number of processing units, and may include single or multiple computing units or multiple processing cores. The processor(s) 502 can be implemented as one or more microprocessors, microcomputers, microcontrollers, digital signal processors, central processing units, state machines, logic circuitries, and/or any devices that manipulate signals based on operational instructions. For instance, the processor(s) 502 may be one or more hardware processors and/or logic circuits of any suitable type specifically programmed or configured to execute the algorithms and processes described herein. The processor(s) 502 can be configured to fetch and execute computer-readable instructions stored in the computer-readable media 504, which can program the processor(s) 502 to perform the functions described herein.

The computer-readable media 504 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 504 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 504 may be used to store any number of functional components that are executable by the processors 502. In many implementations, these functional components comprise instructions or programs that are executable by the processors 502 and that, when executed, specifically configure the one or more processors 502 to perform the actions attributed above to the service computing device 102. Functional components stored in the computer-readable media 504 may include the inventory module 118, the commission module 132, and the payment module 202. Additional functional components stored in the computer-readable media 504 may include an operating system 508 for controlling and managing various functions of the service computing device 102.

In addition, the computer-readable media 504 may store data used for performing the operations described herein. Thus, the computer-readable media may store the transaction data 116 and the inventory data 120. The service computing device 102 may also include or maintain other functional components and data, such as other modules and data 512, which may include programs, drivers, etc., and the data used or generated by the functional components. Further, the service computing device 102 may include many other logical, programmatic and physical components, of which those described above are merely examples that are related to the discussion herein.

The communication interface(s) 506 may include one or more interfaces and hardware components for enabling communication with various other devices, such as over the network(s) 108. For example, communication interface(s) 506 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 514. Such I/O devices 514 may include a display, various user interface controls (e.g., buttons, joystick, keyboard, mouse, touch screen, etc.), audio speakers, connection ports and so forth.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. A system comprising:
a merchant application installed for configuring a merchant device as a point-of-sale (POS) terminal, the merchant application configuring the POS terminal to transmit transaction information associated with a plurality of POS transactions that occur during a business day to a payment processing service, the transaction information indicating at least how many items of each product of an inventory of a merchant are sold throughout the business day; and
one or more servers associated with the payment processing service, the one or more servers comprising:
  one or more processors; and
  one or more computer-readable media storing instructions executable by the one or more processors, wherein the instructions program the one or more processors to perform actions comprising:
    storing inventory information for multiple products that are stocked by the merchant, the inventory information including inventory counts of the products, an inventory count of a product indicating how many items of the product are in stock, the inventory information additionally indicating a shelf life of each product and an age of each product;
    receiving, from the merchant application, the transaction information;
    determining sales rates of the multiple products based at least in part on the transaction information;
    determining sale priorities of the multiple products, a sale priority of a product being based at least in part on the inventory count of the product, the sales rate of the product, the shelf life of the product, and the age of the product;
    determining amounts of sales commissions to be paid by the merchant to a salesperson for selling the products, wherein the sales commission for each product is determined as a function of the sale priority of the product;
    updating the inventory counts throughout the business day based at least in part on the transaction information to generate updated inventory counts, the updated inventory counts indicating how many items of each product are currently in stock;
    updating the sale priorities throughout the business day based at least in part on the updated inventory counts;
    updating the amounts of the sales commissions throughout the business day based at least in part on the updated sale priorities to generate updated amounts of sales commissions; and
    transmitting the updated amounts of the sales commissions to the merchant application, wherein the merchant application is configured to present the updated amounts of the sales commission to the salesperson of the merchant throughout the business day to influence the sales rates of the products throughout the business day.

2. The system of claim 1, the sale priority of each product being further based at least in part on one or more of:
- a profit margin for the product;
- a demand for the product;
- a value of the product;
- a projected appreciation or depreciation in the value of the product;
- a carrying cost of the product;
- an estimated time to obsolescence of the product;
- an inventory space used to store the product;
- a wholesale availability of the product; or
- a lead-time to acquire the product.

3. The system of claim 1, wherein:
- the actions further comprise determining a sales rate of a particular product based at least in part on the transaction information;
- determining the sale priority of a particular product comprises determining that the age of the particular product will exceed the shelf life of the particular product at the sales rate of the particular product; and
- the actions further comprise increasing the amount of the commission for the particular product in response to determining that the age of the particular product will exceed the shelf life of the particular product at the sales rate.

4. The system of claim 1, wherein:
- an individual commission is associated with a POS transaction conducted by the salesperson during a work shift; and
- the actions further comprise initiating an electronic funds transfer of the commission to the salesperson during the work shift.

5. The system of claim 1, wherein:
- an individual commission is associated with a POS transaction conducted by the salesperson during a first work shift; and
- the actions further comprise initiating an electronic funds transfer of the commission to the salesperson before a second work shift of the salesperson, wherein the second work shift is the next work shift of the salesperson after the first work shift.

6. A method, comprising:
- determining, by one or more servers associated with a payment processing service, amounts of commissions for multiple products that are stocked by a merchant, the commission amount for each product being based at least in part on an inventory count of the product, the inventory count of the product indicating how many items of the product are in stock;
- receiving, from a merchant application executable via a merchant device associated with the merchant, transaction information for a plurality of sale transactions that occur during a time period, the transaction information indicating how many items of each product are sold throughout the time period;
- repeatedly updating, by the one or more servers, the inventory counts throughout the time period based at least in part on the transaction information to generate updated inventory counts;
- repeatedly updating, by the one or more servers, the commission amounts throughout the time period based at least in part on the updated inventory counts to generate updated commission amounts; and
- offering, via a presentation output by the merchant application via the merchant device, the updated commission amounts to a salesperson as incentive for selling the products.

7. The method of claim 6, wherein:
- one of the sales transactions is for one of the products; and
- the method further comprises paying an updated commission amount of the updated commission amounts for said one of the products.

8. The method of claim 6, wherein:
- one of the sales transactions is for one of the products and occurs at a transaction time; and
- the method further comprises paying an updated commission amount of the updated commission amounts for said one of the products within an hour of the transaction time.

9. The method of claim 6, one or more of the sale transactions being associated with a respective product, the method further comprising initiating an electronic fund transfer of an updated commission amount of the updated commission amounts for the respective product to an account associated with the salesperson.

10. The method of claim 6, one or more of the sale transactions being associated with a respective product, the method further comprising transferring an updated commission amount of the updated commission amounts for the respective product to the salesperson using debit card information of the salesperson.

11. The method of claim 6, one or more of the sale transactions being associated with a respective product, the method further comprising initiating a separate electronic funds transfer of an updated commission amount of the updated commission amounts to an account associated with the salesperson for each sale transaction of the plurality of sale transactions.

12. The method of claim 6, further comprising:
- determining a current sales rate of a particular product based at least in part on the transaction information;
- determining that a particular product will exceed a shelf life of the particular product at a current sales rate of the particular product; and
- updating the commission amounts based at least in part on increasing the commission amount for the particular product in response to determining that the particular product will exceed the shelf life of the particular product at the current sales rate of the particular product.

13. The method of claim 6, wherein:
- one of the sales transactions is conducted by the salesperson during a work shift; and
- the method further comprises initiating an electronic funds transfer of the commission amount for each product associated with the one of the sales transactions to the salesperson during the work shift.

14. The method of claim 6, wherein:
- one of the sales transactions is conducted by the salesperson during a first work shift of the salesperson; and
- the method further comprises initiating an electronic funds transfer of the commission amount for each product associated with the one of the sales transactions to the salesperson before a second work shift of the salesperson, wherein the second work shift is the next work shift of the salesperson after the first work shift.

15. A method, comprising:
- determining, by one or more servers of a payment processing service, sale priorities of multiple products that are stocked by a merchant;
- receiving, from a merchant application executable on a merchant device of the merchant, transaction information for a plurality of sale transactions that occur during a first time period, the transaction information indicating how many items of each product are sold throughout the first time period;

repeatedly updating, by the one or more servers, the sale priorities throughout the first time period based at least in part on the transaction information;

designating, by the one or more servers, a prioritized product of the multiple products based at least in part on the updated sale priorities; and offering, by the one or more servers, a compensation award to a salesperson for one or more sales of the prioritized product during the first time period.

16. The method of claim 15, wherein the compensation award comprises one or more of:
   a bonus payment for selling at least a specified number of items of the prioritized product;
   a bonus payment for selling at least a specified number of items of the prioritized product within a business day;
   a commission for each item of the prioritized product sold by the salesperson; or
   a bonus payment for selling at least a specified dollar amount of the prioritized product.

17. The method of claim 15, wherein determining the sale priorities comprises comparing determining whether a shelf life of a particular product will be exceeded based at least in part on an inventory count of the particular product and a current sales rate of the product.

18. The method of claim 15, wherein determining the sale priorities is further based at least in part on one or more of:
   an age of the product;
   a shelf life of the product;
   a sales rate of the product;
   a profit margin for the product;
   a demand for the product; or
   a value of the product.

19. The method of claim 15, wherein determining the sale priorities is further based at least in part on one or more of:
   a carrying cost of the product;
   a projected appreciation or depreciation in value of the product;
   a lead-time to acquire the product;
   a wholesale availability of the product;
   an estimated time to obsolescence of the product; or
   an inventory space used to store the product.

20. The method of claim 15, further comprising paying the compensation award to the salesperson before a second time period, wherein the second time period is a next business day after the first time period.

* * * * *